Jan. 1, 1935.  A. KEGRESSE  1,986,270
DRIVING PULLEY HAVING TEETH OF VARIABLE PITCH
Filed Dec. 24, 1932   3 Sheets-Sheet 1

INVENTOR:
Adolphe Kégresse
BY
ATTORNEY

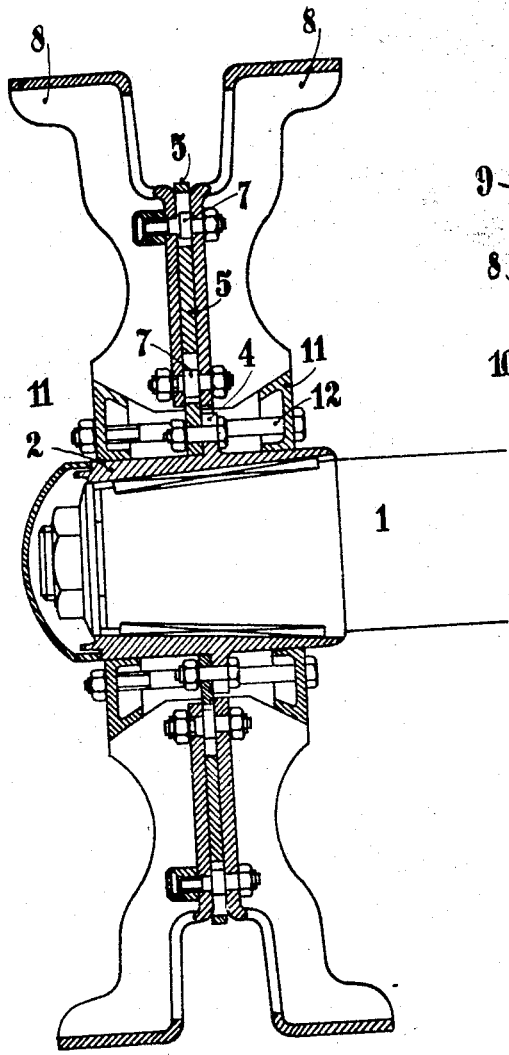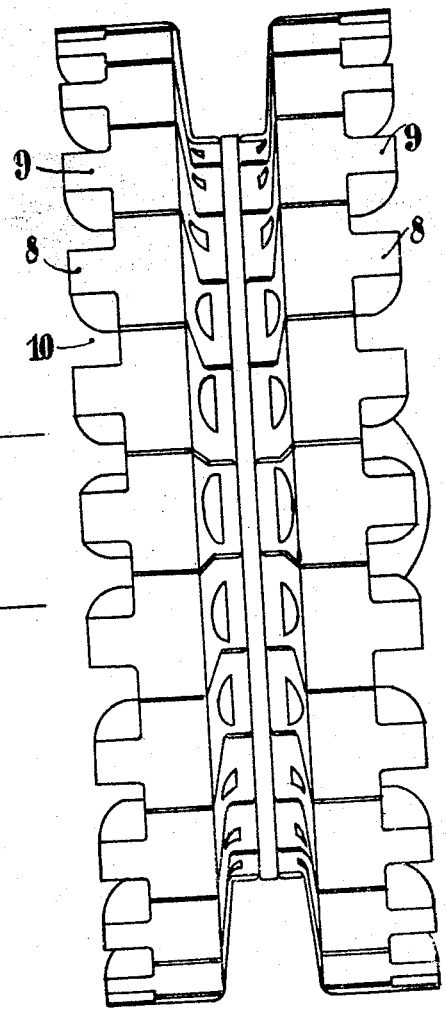

Patented Jan. 1, 1935

1,986,270

UNITED STATES PATENT OFFICE 1,986,270

DRIVING PULLEY HAVING TEETH OF VARIABLE PITCH

Adolphe Kégresse, Courbevoie, France

Application December 24, 1932, Serial No. 648,786
In France December 26, 1931

6 Claims. (Cl. 64—8)

Expanding pulleys for flat or trapezoidal section transmission belts are already known, but such pulleys for belts comprising driving teeth are not known. The present invention relates to pulleys of this last-mentioned type.

In the accompanying drawings:

Figure 3 is a section taken along the line A—B in Figure 1.

Figure 4 shows a side view of the pulley.

Figure 1:
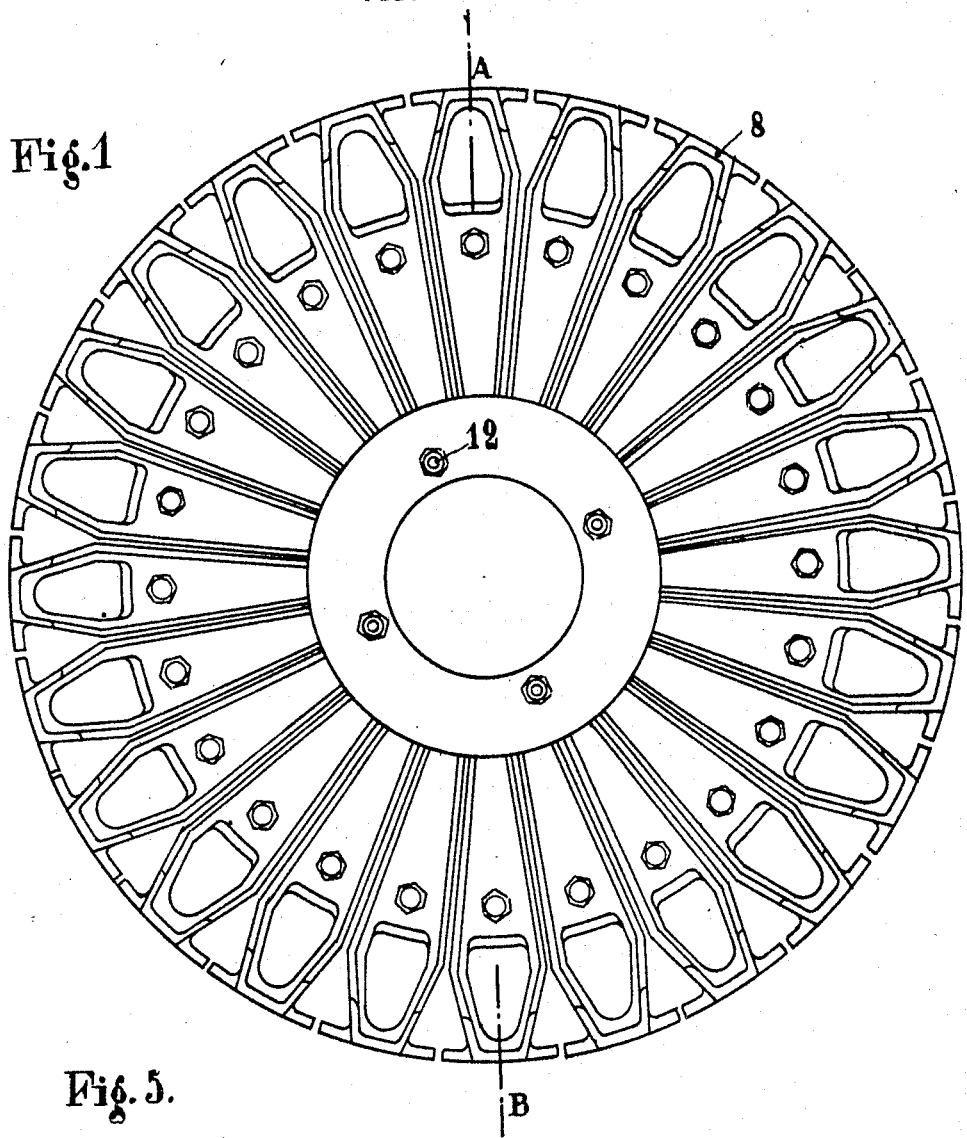
Figure 1 shows a pulley in elevation.

The pulley is driven by a shaft 1 (Figures 1 and 3) on which is keyed a hub 2 (Figure 3) comprising a flange 4.

Figure 2:
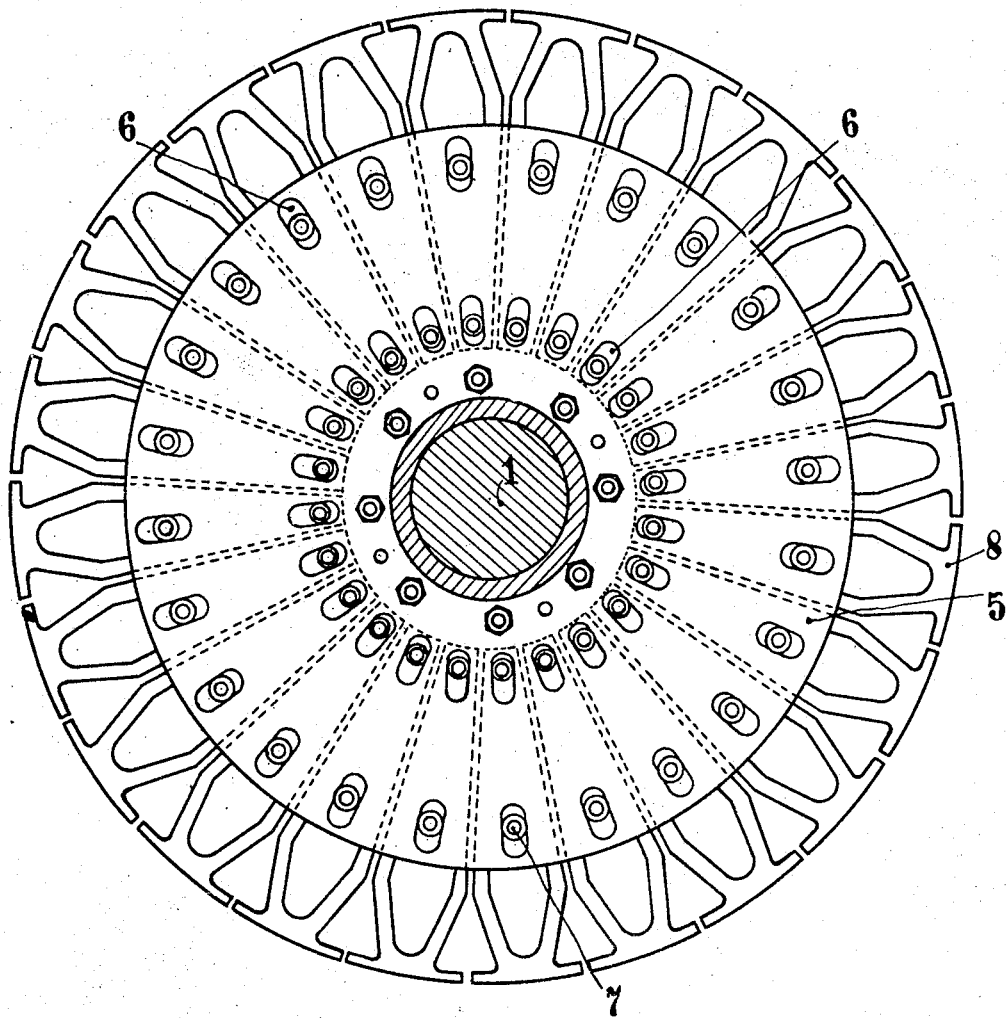
Figure 2 is a view in elevation of the same pulley with the external elements retracted.

To the said flange is permanently bolted a disc 5 (Figures 2 and 3) comprising, near its centre and near its periphery, oval orifices 6 wherein bolts 7 are adapted to slide. The pulley itself is constituted by a series of elements 8 of suitable shape which, when assembled together by means of the bolts 7, form a rim which is toothed on the edges.

The flat parts 9 of the said rim serve as support for the belt, while recesses 10 accommodate the driving teeth fixed to the band. As shown in Figure 4, the said recesses may open on the outside of the rim or may be provided in the middle of the said rim.

The elements 8 rest by their base on two outwardly conical crowns 11 (Figure 3) connected together by bolts 12, the number of which may vary. The said conical crowns 11 are slidable on the hub 2.

Assuming that the bolts 7 have been slackened off, it is evident that, by tightening the nuts of the bolts 12, the cones 11 will act upon the cooperating part of the elements 8 and cause the latter to move away from the centre, thus increasing the diameter of the pulley and at the same time the pitch of its teeth.

Figure 5:
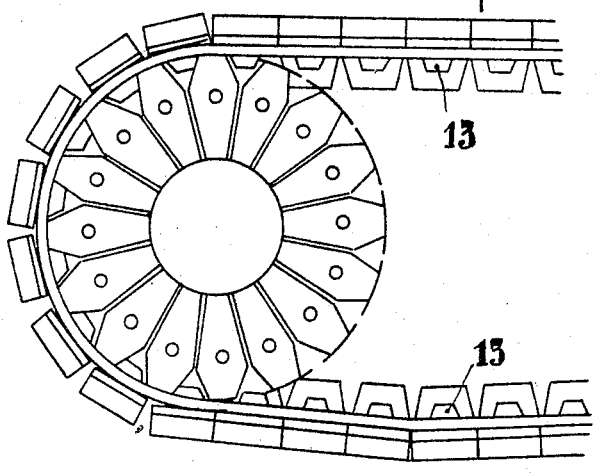
Figure 5 shows the application of such a pulley to the driving of the flexible band of a vehicle propelled by endless track.

Figure 5 shows one of the applications of the device according to the invention, namely a driving pulley for an endless track vehicle. The figure shows the teeth 13 permanently fixed to the endless track, which teeth engage recesses 10 formed by the assembly of the elements 8 of the pulley.

The same feature may be applied also to metallic endless belts of the type of the gall chain or to a chain for an endless track vehicle.

I claim:—

1. A pulley for toothed tractor belts comprising a disc, a plurality of pairs of radially adjustable sector-like elements, each of the elements having a smooth arcuate belt-engaging surface provided with notches on the lateral edges for cooperating with the teeth carried by the belt, the sector-like elements of each pair being positioned on opposite sides of the disc, and means for detachably securing the elements of each pair together and to said disc.

2. A pulley for toothed tractor belts comprising a disc, a plurality of pairs of radially adjustable sector-like elements, each of the elements having a smooth arcuate belt-engaging surface provided with notches on the lateral edges for cooperating with the teeth carried by the belt, the sector-like elements of each pair being positioned on opposite sides of the disc, means for detachably securing the elements of each pair together and to said disc, and means for radially moving said elements relatively to said disc.

3. A pulley for toothed tractor belts comprising a disc, a plurality of pairs of sector-like elements, each of the elements having a belt-engaging surface provided with notches for cooperating with the teeth carried by the belt, the sector-like elements of each pair being positioned on opposite sides of the disc, means for detachably securing the elements of each pair together and to said disc, a conical sleeve mounted on each side of said disc in axial alignment therewith, the inner end surfaces of said sector-like elements being shaped to bear on said conical sleeves, and means for drawing said conical sleeves axially together to force said sector-like elements radially outwardly.

4. A driving pulley for endless track tractor belts provided with teeth, comprising a hub having a cylindrical outer surface, a flange carried by said hub, an annular disc detachably secured to said flange, said annular disc having a plurality of annularly spaced pairs of radially aligned and radially elongated slots formed therein, a plurality of pairs of symmetrical sector-like elements, each of said elements having a smooth arcuate belt-engaging surface provided with notches on the lateral edges to receive the teeth carried by the belt, the sector-like elements of each pair being radially adjustably positioned on opposite sides of the annular disc, and means extending through said slots for detachably securing the elements of each pair together and to said disc.

5. A driving pulley for toothed tractor belts comprising a hub having a cylindrical outer surface, a disc carried by said hub on the central portion of the cylindrical surface of said hub, said disc having a plurality of annularly spaced pairs of radially aligned and radially elongated slots, a plurality of pairs of symmetrical sector-like elements, the elements of each pair being positioned on opposite sides of the disc, means extending through the elongated slots in the disc for securing said elements of each pair together and in radially adjusted positions on the disc, each of said sector-shaped elements having a smooth arcuate belt-engaging portion provided with recesses adapted to cooperate with recesses in adjacent elements to provide notches to receive the teeth on said belt, and means on said hub for radially moving said sector-shaped elements relatively to said disc.

6. A driving pulley for toothed tractor belts comprising a hub having a cylindrical outer surface, a disc carried by said hub on the central portion of the cylindrical surface of said hub, said disc having a plurality of annularly spaced pairs of radially aligned and radially elongated slots, a plurality of pairs of symmetrical sector-like elements, the elements of each pair being positioned on opposite sides of the disc, means extending through the elongated slots in the disc for securing said elements of each pair together and in adjusted positions on the disc, the arcuate portion of each of said sector-shaped elements being provided with recesses adapted to cooperate with recesses in adjacent elements to provide notches to receive the teeth on said belt, an annular member having a frusto-conical peripheral surface positioned on each side of the disc and axially slidable on the hub, the inner ends of said sector-like elements bearing on said frusto-conical surfaces, the apex portions of said frusto-conical members being positioned toward each other, and means for drawing said members together to force the sector-like elements radially from said hub.

ADOLPHE KÉGRESSE.